(12) United States Patent
Jung et al.

(10) Patent No.: US 8,071,951 B2
(45) Date of Patent: Dec. 6, 2011

(54) METHOD OF DRIVING X-RAY DETECTOR AND X-RAY DETECTOR USING THE SAME

(75) Inventors: Kwan-Wook Jung, Suwon-si (KR); Kyung-Sang Goo, Hwaseong-si (KR); Dae-Ho Choo, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 190 days.

(21) Appl. No.: 12/409,546

(22) Filed: Mar. 24, 2009

(65) Prior Publication Data

US 2009/0245465 A1    Oct. 1, 2009

(30) Foreign Application Priority Data

Mar. 25, 2008 (KR) ................. 10-2008-0027472

(51) Int. Cl.
*G01T 1/24* (2006.01)
(52) U.S. Cl. ................................. 250/370.09
(58) Field of Classification Search .............. 250/370.09
See application file for complete search history.

(56) References Cited

U.S. PATENT DOCUMENTS 6,980,246 B1    12/2005   Ducourant et al.

FOREIGN PATENT DOCUMENTS

| EP | 1378942 A1 | 1/2004 |
|---|---|---|
| EP | 1179741 B1 | 9/2007 |
| EP | 1176814 A3 | 5/2008 |

OTHER PUBLICATIONS

Extended European Search Report for application No. 09000631.3-2202 dated Aug. 3, 2011.

*Primary Examiner* — Constantine Hannaher
(74) *Attorney, Agent, or Firm* — Cantor Colburn LLP

(57) ABSTRACT

In a method of driving an x-ray detector having a switching device connected to a light detecting pixel comprising a photodiode which detects an x-ray emitted from an x-ray generator and outputs an electrical signal corresponding to the x-ray, the method includes: receiving an x-ray with the photodiode during an x-ray detecting period to generate the electrical signal corresponding to the x-ray; turning on the switching device using a gate signal during a first gate turn-on period to transmit the electrical signal to an external component; providing a light to the photodiode during a first flash period of an offset control period; and turning on the switching device during a second gate turn-on period of the offset control period during which the light is not provided to the photodiode to maintain an electric potential at a coupling node disposed between the photodiode and the switching device at a predetermined level.

16 Claims, 4 Drawing Sheets

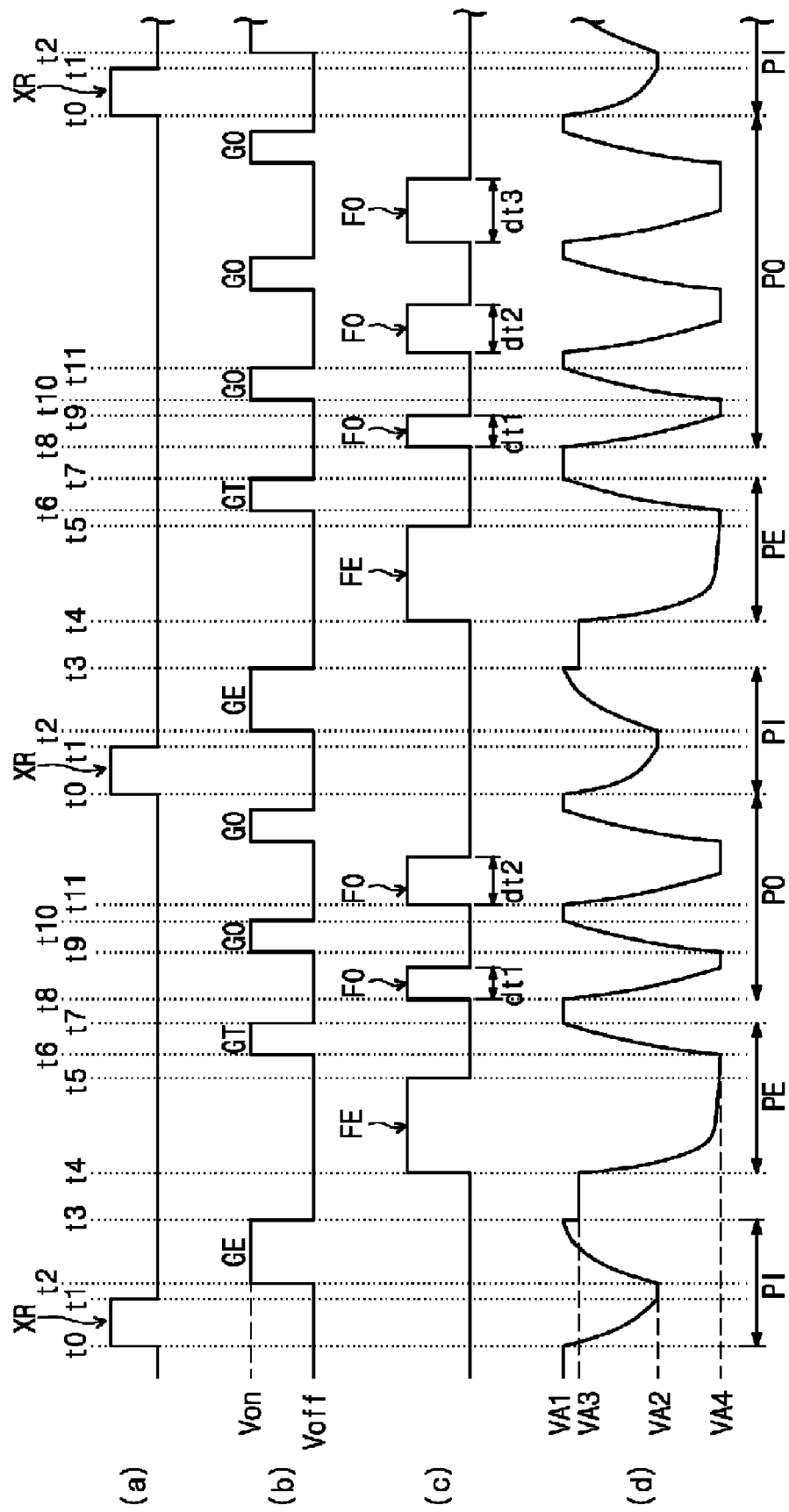

METHOD OF DRIVING X-RAY DETECTOR AND X-RAY DETECTOR USING THE SAME

This application claims priority to Korean Patent Application No. 2008-27472, filed on Mar. 25, 2008, and all the benefits accruing therefrom under 35 U.S.C. §119, the contents of which in its entirety are herein incorporated by reference.

BACKGROUND OF THE INVENTION

1. Field of the Invention

The present invention relates to a method of driving an x-ray detector and an x-ray detector using the same. More particularly, the present invention relates to an x-ray detector and a method of driving the x-ray detector in which image distortion caused by an offset voltage deviation is substantially reduced and/or effectively prevented.

2. Description of the Related Art

An x-ray detector is used, for example, as a medical diagnosis device which detects an x-ray image of an object photographed by an x-ray generator, to provide the x-ray image to a display device.

Recently, a flat panel detector which utilizes a digital radiography ("DR") method has been widely used as an x-ray detector, since the DR method does not require film. A flat panel x-ray detector using the DR method typically includes a plurality of light detecting pixels in the flat panel detector to detect an x-ray incident thereon. Each light detecting pixel of the plurality of light detecting pixels includes a photodiode. The photodiode detects an x-ray emitted from an x-ray generator and outputs an electrical signal proportional to the x-ray. The light detecting pixel further includes a switching device which transmits the electrical signal output from the photodiode to a readout integrated circuit of the flat panel x-ray detector.

The readout integrated circuit reads out, e.g., receives, the electrical signal from the flat panel detector. Specifically, the readout integrated circuit reads out the electrical signal based on a gate voltage provided from a gate driver which sequentially turns on switching devices of associated light detecting pixels arranged in a row direction. Thus, the readout integrated circuit sequentially reads out electrical signals on a row basis.

The electrical signal is thereafter output from the readout integrated circuit and is processed in a controller, typically disposed on a main board. The electrical signal is thereafter converted to an image signal and transmitted to a display device to display the x-ray image thereon.

In general, when the x-ray is not provided to the flat panel from the x-ray generator, an electric potential at a coupling node (e.g., a node at which the photodiode and the switching device of a given light detecting pixel are connected) gradually changes based on a changing offset voltage of the photodiode. Further, when an input interval, e.g., a duty cycle, of the x-supplied ray from the x-ray generator is varied, an operation timing of the photo diode changes and, as a result, the offset voltage at the coupling node further varies.

As a result of the varying offset voltage at the coupling node, the electrical signal output from the photodiode is adversely affected. For example, a distortion in which the offset voltage is added to the electrical signal when the switching device is turned on may occur. To mitigate this problem, an offset compensation method which detects the offset voltage of the signal output from the switching device to remove the offset voltage from the electrical signal has been suggested. However, in the offset compensation method of the prior art, when the offset voltage varies based on the operation timing of the photo diode, as described above, it is difficult to perform the offset compensation method. As a result, a distorted image, caused by an offset voltage deviation based on the operation timing of the photo diode, is displayed on the display device of the x-ray detector of the prior art.

BRIEF SUMMARY OF THE INVENTION

Exemplary embodiments of the present invention provide a method of driving an x-ray detector in which image distortion caused by an offset voltage deviation is effectively prevented.

Exemplary embodiments of the present invention also provide an x-ray detector using the driving method in which the image distortion caused by the offset voltage deviation is effectively prevented.

In an exemplary embodiment of the present invention, an x-ray detector includes an x-ray generator which emits an x-ray and a light detecting pixel. The light detecting pixel includes a photodiode which detects the x-ray emitted from the x-ray generator during an x-ray detecting period, and outputs an electrical signal corresponding to the x-ray. The light detecting pixel further includes a switching device connected to the photodiode.

The x-ray detector further includes a light-generating sheet which provides a light to the photodiode during a first flash period of an offset control period, a gate driver which outputs a gate signal to the switching device, and a read-out circuit which receives a signal output from an output terminal of the switching device. The gate signal includes a first gate turn-on signal which turns on the switching device during a first gate turn-on period of the x-ray detecting period, and a second gate turn-on signal which turns on the switching device during a second gate turn-on period of the offset control period.

In an alternative exemplary embodiment of the present invention, a method of driving an x-ray detector is provided. The x-ray detector includes a switching device connected to a light detecting pixel comprising a photodiode which detects an x-ray emitted from an x-ray generator during an x-ray detecting period and outputs an electrical signal corresponding to the x-ray.

The method includes: receiving the x-ray from the x-ray generator with the photodiode during the x-ray detecting period to generate the electrical signal corresponding to the x-ray; turning on the switching device during a first gate turn-on period of the x-ray detecting period to transmit the electrical signal to an external component; providing a light to the photodiode during an offset control period after the x-ray detecting period; and turning on the switching device during a second gate turn-on period of the offset control period during which the light is not provided to the photodiode to maintain an electric potential at a coupling node disposed between the photodiode and the switching device at a predetermined level.

According to exemplary embodiments of the present invention, an electric potential at a coupling node of a photodiode and a switching device is uniformly maintained at a predetermined level, thereby preventing image distortion caused by an offset voltage deviation.

BRIEF DESCRIPTION OF THE DRAWINGS

The above and other aspects, features and advantages of the present invention will become more readily apparent by describing in further detail exemplary embodiments thereof with reference to the accompanying drawings, in which:

FIGS. 3A to 3D and 4A to 4D are signal timing diagrams illustrating waveforms of the x-ray detector according to the exemplary embodiment of the present invention shown in FIG. 2.

DETAILED DESCRIPTION OF THE INVENTION

Figure 1:
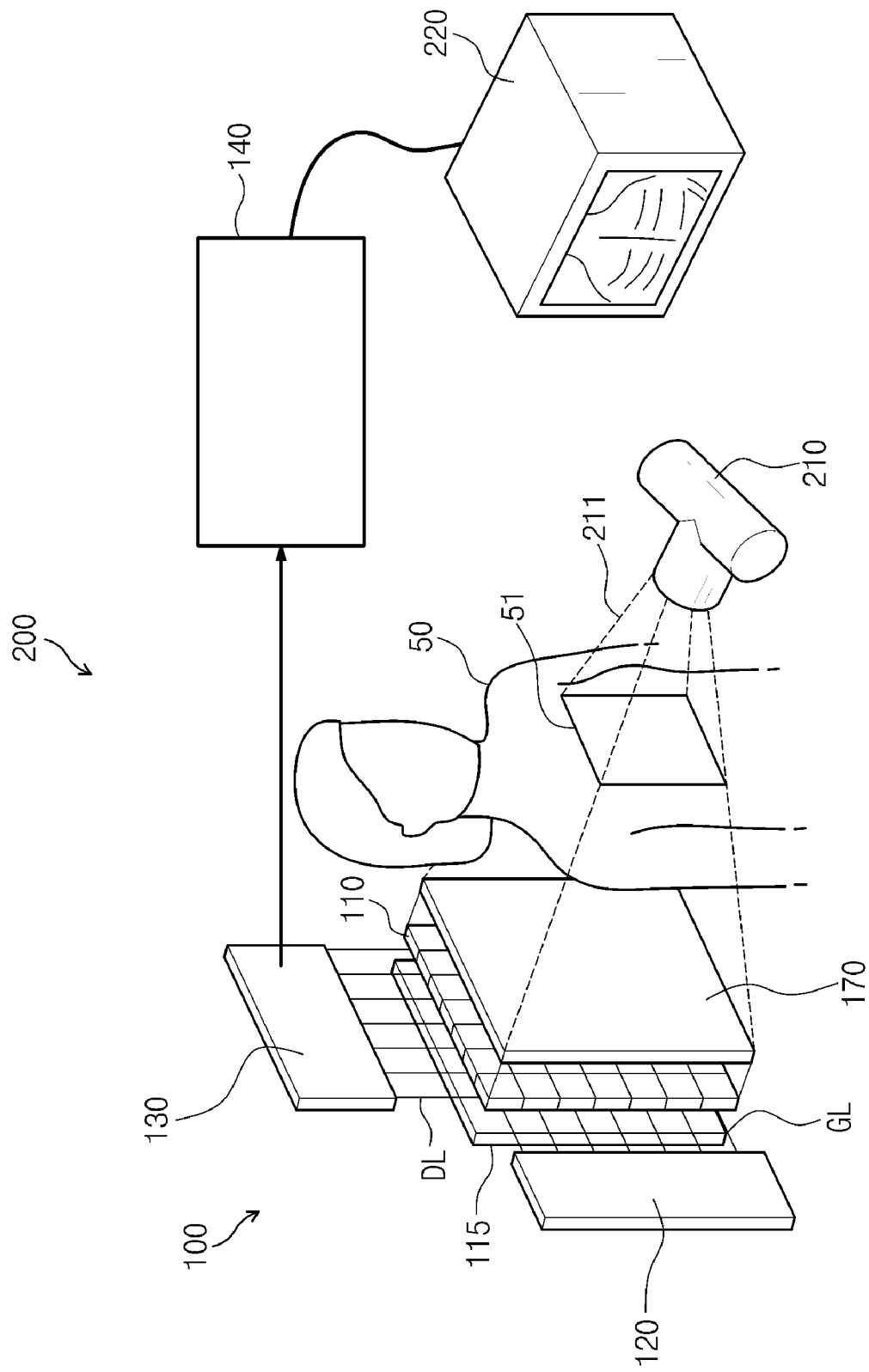
FIG. 1 is a view showing an exemplary embodiment of an X-ray system.

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, exemplary embodiments of the present invention will be described in further detail with reference to the accompanying drawings.

FIG. 1 is a view showing an exemplary embodiment of an X-ray system.

Referring to FIG. 1, an X-ray system 200 includes an X-ray generator 210 that generates X-rays 211 in a direction toward a predetermined region 51 of a patient 50 (that is, an inspection region), an X-ray detector 100 that detects X-rays 211 which have passed through the predetermined region 51 of the patient 50, and a display apparatus 220 that displays an image by receiving image signals corresponding to the X-rays 211 detected by the X-ray detector 100. Although the present exemplary embodiment of an X-ray system 200 is described with respect to the imaging of a patient 50, it would be clear to one of ordinary skill in the art that such an exemplary embodiment of an X-ray system 200 may be applied to a wide range of applications wherein X-ray imaging is desired, e.g., luggage inspection, etc.

In such an X-ray system 200, if the X-ray is irradiated onto the predetermined region 51 of the patient 50, the scintillator 170 provided between a flat panel 110 of the X-ray detector 100 and the patient 50 converts the X-ray 211, which has passed through the patient 50, into green light to provide the green light to the flat panel 110.

The X-ray detector 100 may be described in detail with reference to FIG. 2.

The X-ray detector 100 obtains image signals corresponding to X-rays 211, which have passed through the patient 50, and then provides the image signal to the display apparatus 220. Accordingly, the display apparatus 220 may display the X-ray images corresponding to the image signals in real time. As an example of the present invention, the display apparatus 220 may include a liquid crystal display ("LCD"), and various other display types as would be known to one of ordinary skill in the art.

Figure 2:
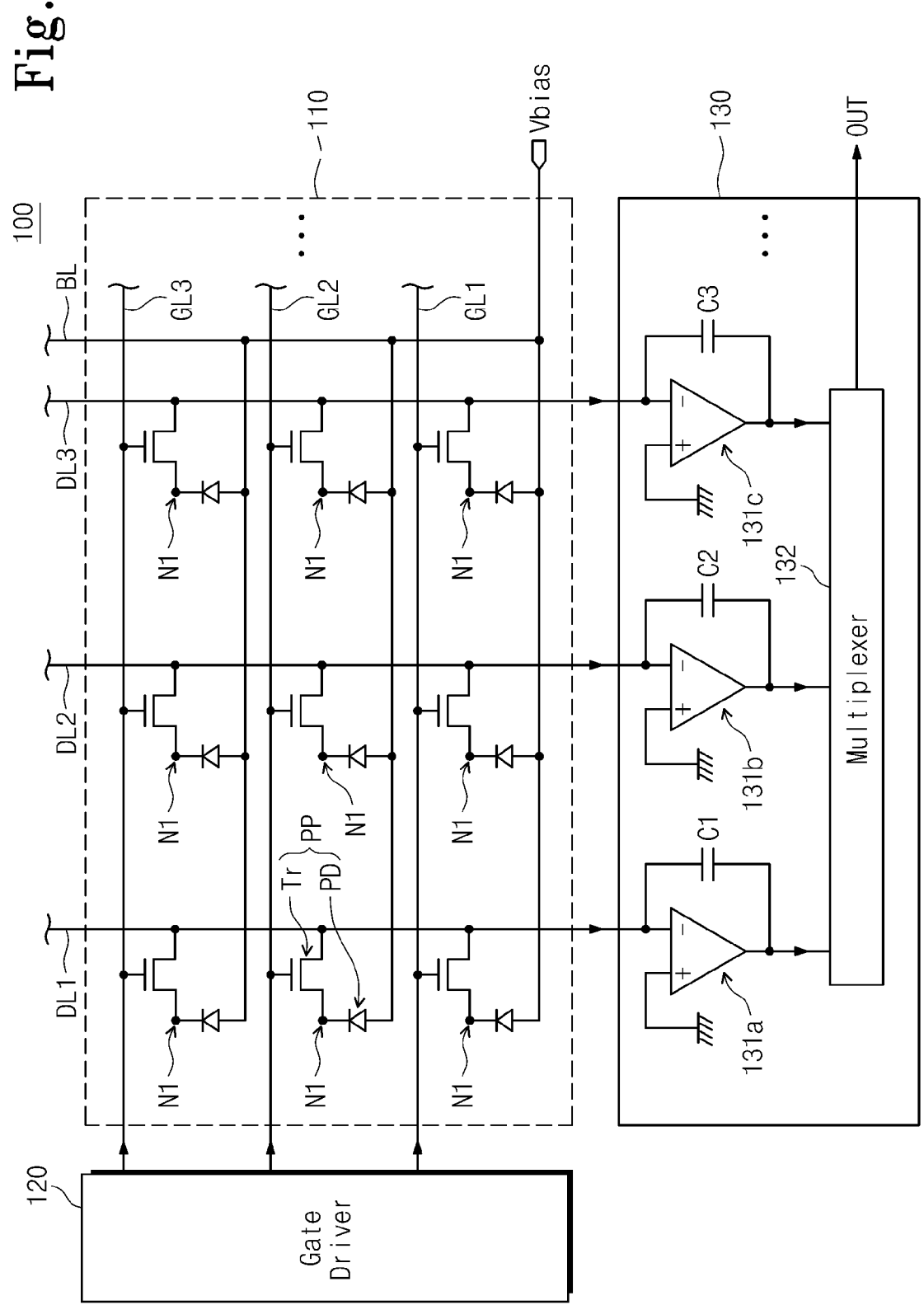
FIG. 2 is a schematic circuit diagram of an x-ray detector according to an exemplary embodiment of the present invention shown in FIG. 1.

FIG. 2 is a schematic circuit diagram of an x-ray detector according to an exemplary embodiment the present invention shown in FIG. 1.

Referring to FIG. 2, an x-ray detector 100 includes a flat panel 110 which includes a plurality of light detecting pixels PP. Each light detecting pixel PP of the plurality of light detecting pixels PP detects an x-ray emitted from an x-ray generator 210 (FIG. 1) and photoelectrically converts the detected x-ray to output an electrical signal proportional to the detected x-ray.

The flat panel 110 further includes gate lines GL which extend substantially in parallel with each other in a first direction, e.g., a row direction, and data lines DL which extend substantially in parallel with each other in a second direction perpendicular to the first direction, e.g., in a column direction. Thus, in an exemplary embodiment, a plurality of areas is formed in a substantially matrix configuration by the gate lines GL and the data lines DL in the flat panel 110, and the light detecting pixels PP are disposed in respective areas of the plurality of areas. For purposes of illustration in FIG. 2, a first gate line GL1, a second gate line GL2 and a third gate line GL3, as well as a first data line DL1, a second data line DL2 and a third data line DL3 are shown, but alternative exemplary embodiments are not limited thereto.

The areas include one of the light detecting pixels PP, and each of the light detecting pixels PP includes a photodiode PD and a transistor Tr. The photodiode PD detects an x-ray emitted from an x-ray generator 210 and converts the detected x-ray into an electrical signal to output the electrical signal.

As shown in FIG. 2, the photodiode PD includes a first electrode connected to an input electrode of the transistor Tr and a second electrode connected to a bias line BL to which a bias voltage Vbias is applied. In an exemplary embodiment of the present invention, the bias voltage Vbias has a voltage level in a range of approximately −5V to approximately −10V. The bias voltage Vbias reverse biases the photodiode PD and, more particularly maintains the photodiode PD in a reverse bias state, as will be described below with reference to FIGS. 3 and 4.

Still referring to FIG. 2, a control electrode of the transistor Tr is electrically connected to a gate driver 120 through a corresponding gate line GL, and an output electrode of the transistor Tr is electrically connected to a readout integrated circuit 130 through a corresponding data line DL. In an exemplary embodiment, a node to which the first electrode of the photodiode PD and the input electrode of the transistor Tr are connected is referred to as a coupling node N1. Thus, each light detecting pixel PP includes an associated coupling node N1 disposed between the photodiode PD and the transistor Tr associated therewith.

The gate driver 120 generates a gate signal and sequentially applies the gate signal to the first, second and third gate lines GL1, GL2 and GL3, respectively. In an exemplary embodiment, the gate signal is a voltage signal and swings between a gate-on voltage which turns on the transistor Tr and a gate-off voltage which turns off the transistor Tr. Specifically, in an exemplary embodiment of the present invention, the gate-on voltage has a voltage level of approximately 15V, and the gate-off voltage has a voltage level of approximately −10V, but alternative exemplary embodiments are not limited thereto.

When the transistor Tr of each of the light detecting pixels PP connected to a gate line GL to which the gate signal is applied is turned on, the electrical signal output from the photodiode PD is applied to a corresponding data line DL through the turned-on transistor Tr. Therefore, the data line DL transmits the electrical signal output from the transistor Tr to the readout integrated circuit 130. Further, since the light detecting pixels PP are turned on row by row in response to the gate signal sequentially supplied to the gate lines GL from the gate driver 120, the electrical signal is transmitted to the readout integrated circuit 130 on a row by row basis, e.g., based on the gate signal.

The readout integrated circuit 130 according to an exemplary embodiment includes a plurality of amplifiers 131a, 131b and 131c and, more specifically, a first amplifier 131a, a second amplifier 131b and a third amplifier 131c connected to the first data line DL1, the second data line DL2 and the third data line DL3, respectively, as shown in FIG. 2. In addition, the readout integrated circuit 130 includes a multiplexer 132 connected to respective output terminals of the plurality of amplifiers 131a, 131b and 131c. In an exemplary embodiment of the present invention, the first, second and third amplifiers 131a, 131b and 131c, respectively, is an operational amplifier ("OP AMP"), but alternative exemplary embodiments are not limited thereto.

As shown in FIG. 2, a negative input terminal ("−") of each of the first, second and third amplifiers 131a, 131b and 131c, respectively, is connected to a corresponding data line DL, e.g., to the first data line DL1, the second data line DL2 and the third data line DL3, respectively, to receive the electrical signal output from a corresponding light detecting pixel PP, and a positive input terminal ("+") of each of the first, second and third amplifiers 131a, 131b and 131c, respectively, receives a reference voltage. In an exemplary embodiment of the present invention, the reference voltage is a ground voltage. As also shown in FIG. 2, first, second and third capacitors C1, C2, and C3, respectively, are connected between the negative input terminal (−) and an output terminal of each of the first amplifier 131a, the second amplifier 131b and the third amplifier 131c.

Input terminals of the multiplexer 132 are connected to corresponding output terminals of each of the first, second and third amplifiers 131a, 131b and 131c, respectively, to receive a signal output therefrom.

In an exemplary embodiment of the present invention, a signal OUT output from the multiplexer 132 is applied to a control circuit (not shown) arranged on a main board, for example, of the x-ray detector 100 and is converted to a digital signal by an analog-to-digital converter (not shown) in the control circuit. The digital signal is transmitted as an image signal to a display device 220 (FIG. 1) connected to the x-ray detector 100. Thus, the display device displays an x-ray image corresponding to the image signal provided from the x-ray detector 100 on a screen of the display device.

FIGS. 3a to 3d are signal timing diagrams illustrating waveforms of an x-ray detector according to an exemplary embodiment of the present invention. More specifically, FIG. 3a is a signal timing diagram showing when an x-ray is provided to the photodiode PD of the x-ray detector 100 according to an exemplary embodiment, FIG. 3b is a signal timing diagram showing when a gate signal is applied to the gate line GL of the x-ray detector 100, FIG. 3c is a signal timing diagram showing when a light is provided from a light generating sheet 115 (FIG. 1) of the x-ray detector, and FIG. 3d is a signal timing diagram showing an electric potential at the coupling node N1 of the x-ray detector 100.

Referring to FIGS. 3a to 3d, a driving period of the x-ray detector 100 (best shown in FIG. 2) includes an x-ray detecting period PI, a signal deleting period PE, and an offset control period P0.

Specifically, the x-ray detecting period PI includes a period during which an x-ray, generated during an x-ray generating period XR, from the x-ray generator is received by the light detecting pixel pp (FIG. 2) and an electrical signal corresponding to the x-ray generated during the x-ray generating period XR is generated.

More specifically, when the x-ray is generated at an initial time point t0, which is at the beginning of the x-ray generating period XR, the photodiode PD (FIG. 2) is biased in a forward direction, and an electric potential at the coupling node N1 to which the photodiode PD and the transistor Tr are connected decreases from a first voltage VA1 at which the coupling node N1 is at the beginning of the x-ray detecting period PI. In an exemplary embodiment, the first voltage VA1 is an initial voltage of the coupling node N1. Thereafter, the electric potential at the coupling node N1 decreases to a second voltage VA2 until a first time point t1, at which the generation of the x-ray is stopped, e.g., until the end of the x-ray generating period XR of the x-ray detecting period PI.

Next, the gate signal applied to the control electrode of the transistor Tr transitions from the gate-off voltage Voff to the gate-on voltage Von at a second time point t2. As a result, the transistor Tr is turned on (in response to the gate-on voltage Von) during a first gate-on period GE between the second time point t2 and a third time point t3, e.g., during a time period in which the gate signal is maintained at the gate-on voltage Von. In response, the electric potential at the coupling node N1 gradually increases back to the first voltage VA1, as shown in FIG. 3d.

Then, the transistor Tr is turned off at the third time point t3, when the gate signal transitions to the gate-off voltage Voff, and the electric potential at the coupling node N1 is thereby lowered to a third voltage VA3. In an exemplary embodiment of the present invention, the third voltage VA3 is less than the first voltage VA1 but greater than the second voltage VA2. Since the transistor Tr is turned off at the third time point t3, the electric potential at the coupling node N1 is maintained at the third voltage VA3, as shown in FIG. 3d. Therefore, the x-ray detecting period PI is substantially defined as being from the initial time point t0 to the third time point t3.

Thereafter follows the signal deleting period PE, which is a period in which the electric potential charged to the coupling node N1 during the x-ray detecting period PI is removed such that the electric potential at the coupling node N1 returns to an initial state, thereby effectively preventing a previous signal, e.g., a previous signal from the light detecting pixel PP, from affecting, e.g., interfering with and/or mixing with, a next signal.

Specifically, the signal deleting period PE begins at a fourth time point t4, at which time the light generating sheet (not shown) generates a light which saturates the photodiode PD, as shown in FIG. 3c.

In an exemplary embodiment of the present invention, the light generating sheet includes an inorganic light emitting material and therewith provides the light to the flat panel 110 (FIG. 2) of the x-ray detector 100 during a second flash period FE. Thus, the photodiode PD is again biased in the forward direction, and the electric potential at the coupling node N1 decreases to a fourth voltage VA4 until a fifth time point t5 at which the supply of the light is stopped, as shown in FIG. 3c. The electric potential at the coupling node N1 is maintained at the fourth voltage VA4 until a sixth time point t6.

At the sixth time point t6, the gate signal transitions to the gate-on voltage Von, and the transistor Tr is turned on during a third gate-on period GT between the sixth time point t6 and a seventh time point t7, as shown in FIG. 3b. The electric potential at the coupling node N1 thereby increases back to the first voltage VA1 during the third gate-on period GT. Therefore, a previous signal is completely removed from the coupling node N1, and the electric potential at the coupling node N1 is thereby initialized. As described above, the signal deleting period PE is defined from the fourth time point t4 to the seventh time point t7.

The offset control period P0 begins after the signal deleting period PE. Specifically, the offset control period P0 includes at least one first flash period F0 during, which the light is generated by the light generating sheet, and at least one second gate-on period G0, during which the gate signal is at the gate-on voltage to turn on the transistor Tr. More specifically, the first flash period F0 is maintained during a time interval in which the photodiode PD (FIG. 2) is saturated and the second gate-on period G0, during which the gate signal transitions to the gate-on voltage Von after the first flash period F0.

As shown in FIGS. 3b and 3c, the first flash period F0 and/or the second gate-on period G0 may occur more than once, e.g., repeatedly, during a single offset control period P0. Further, in an exemplary embodiment of the present invention, the first flash periods F0 may have a same time width dt, e.g., a duration dt, but alternative exemplary embodiments are not limited thereto. For example, in an alternative exemplary embodiment of the present invention, durations of the first flash periods F0 and/or the second gate-on periods G0 may be varied, as will be described in further detail below with reference to FIG. 4.

Still referring to FIG. 3d, the electric potential at the coupling node N1 decreases between an eighth time point t8, at which the first flash period F0 begins, and is eventually lowered to the fourth voltage VA4 at a ninth time point t9, at which the first flash period F0 is finished. Then, the second gate-on period G0 begins at a tenth time point t10 at which the gate signal transitions to the gate-on voltage Von, as shown in FIG. 3b. Thus, the electric potential at the coupling node N1 increases during the second gate-on period G0 and reaches the first voltage VA1 at an eleventh time point t11, e.g., at a time point at which the second gate-on period G0 ends.

Thus, as described above, the electric potential at the coupling node N1 is uniformly maintained at the first voltage VA1 even when the second gate-on period G0 is removed, since the first flash period F0 and the second gate-on period G0 occur.

Figure 3:
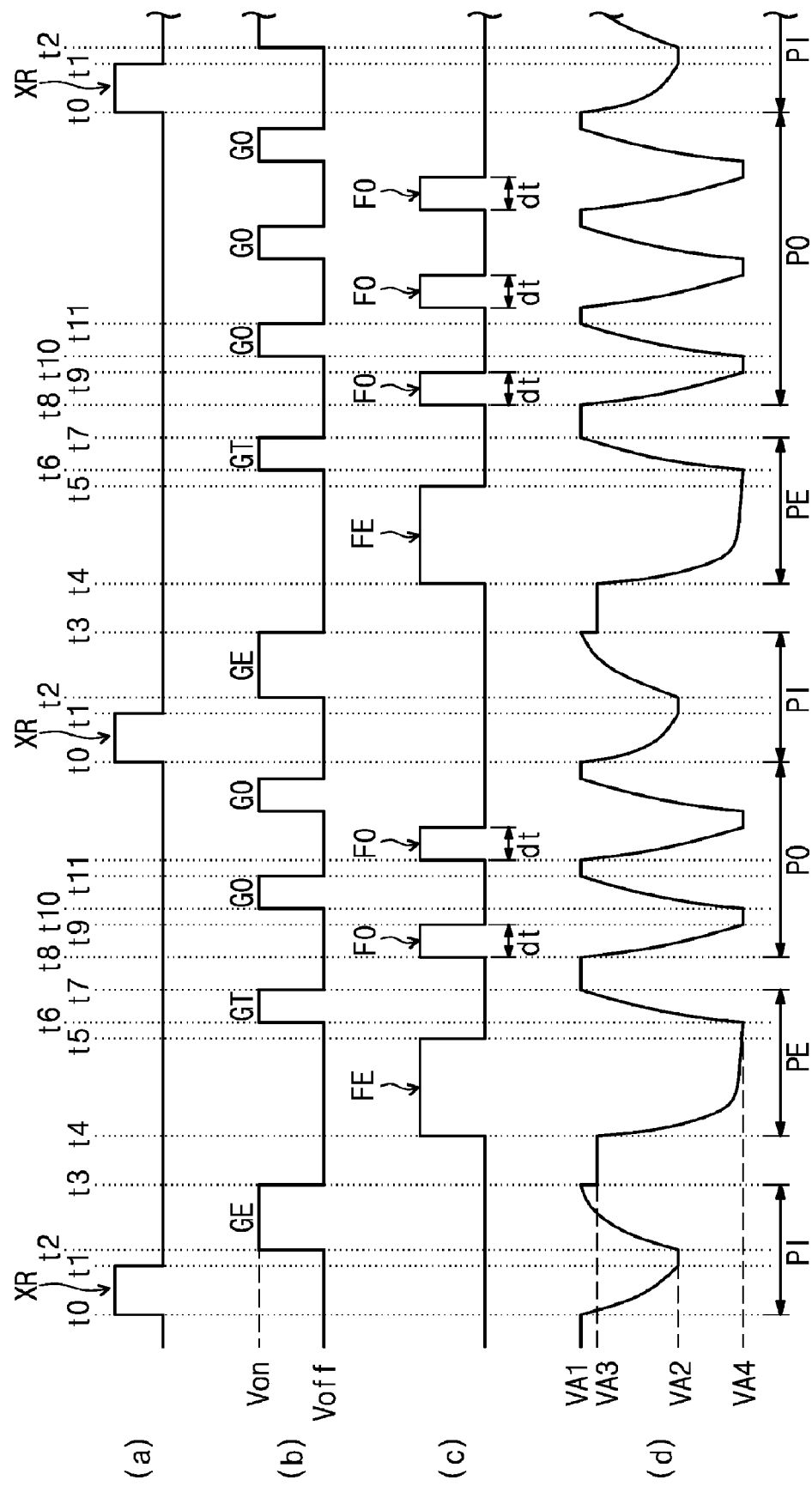

The offset control period P0, as shown in FIG. 3, is therefore defined as being from the eighth time point t8, at which the light, e.g., an optical flash, is generated, to a subsequent initial time point t0, e.g., when a next x-ray is generated in the next x-ray generating period XR. Accordingly, the electric potential at the coupling node N1 of the x-ray detector 100 according to an exemplary embodiment of the present invention is uniformly maintained at the first voltage VA1 at the initial time point t0 when the next x-ray is generated in the offset control period P0. Therefore, an offset voltage deviation is substantially reduced and/or effectively prevented in the x-ray detector 100 according to an exemplary embodiment.

FIGS. 4a to 4d are signal timing diagrams illustrating waveforms of an x-ray detector according to an alternative exemplary embodiment of the present invention. Specifically, FIG. 4a is a signal timing diagram showing when an x-ray is provided to the photodiode PD of the x-ray detector 100 according to an exemplary embodiment of the present invention, FIG. 4b is a signal timing diagram showing when a gate signal applied to the gate line GL of the x-ray detector 100, FIG. 4c is a signal timing diagram showing when a light is provided from a light generating sheet (not shown) according to an alternative exemplary embodiment of the present invention, and FIG. 4d is a signal timing diagram showing an electric potential at the coupling node N1 of the x-ray detector 100 according to an alternative exemplary embodiment. The same reference characters in FIG. 4 refer to the same or like components as shown in FIG. 3, and any repetitive detailed description thereof has been omitted.

Referring to FIGS. 4a to 4d, the driving period of the x-ray detector 100 (best shown in FIG. 2) includes an x-ray detecting period PI, a signal deleting period PE and an offset control period P0.

The offset control period P0 begins after the signal deleting period PE, as shown in FIG. 4d. The offset control period P0 includes a first flash period F0 during which a light is generated from a light generating sheet 115 (FIG. 1) and a second gate-on period G0 during which a gate signal which turns on the transistor Tr is output. The second gate-on period G0 according to an exemplary embodiment is a period during which the gate signal transitions to the gate-on voltage Von and, more particularly, begins after the first flash period F0, as shown in FIG. 4c.

The first flash period F0 and the second gate-on period P0 occur repeatedly during a given offset control period P0. For example, in an exemplary embodiment of the present invention, first flash periods F0 which occur during the given offset control period P0 have different time widths, e.g., durations, from each other. More specifically, consecutive first flash periods F0 according to an exemplary embodiment have a first time width dt1, a second time width dt2 and/or a third time width dt3.

In an exemplary embodiment of the present invention, each first flash period F0 is maintained over a time period during which the photodiode PD is saturated by the light from the light generating sheet.

The electric potential at the coupling node N1 decreases from an eighth time point t8, at which the first flash period F0 begins, and is decreases to a fourth voltage VA4 at a ninth time point t9, at which the first flash period F0 ends, as shown in FIG. 4c. Then, the second gate-on period G0 begins at a tenth time point t10, at which point the gate signal transitions to the gate-on voltage Von. Thus, the electric potential at the coupling node N1 increases during the second gate-on period G0 and reaches the first voltage VA1 at an eleventh time point t11, at which the second gate-on period G0 ends.

As described above, since the first flash period F0 and the second gate-on period G0 occur repeatedly, e.g., more than once for a given offset control period P0, the electric potential at the coupling node N1 is uniformly maintained at the first voltage VA1 at a time when the second gate-on period G0.

Thus, the offset control period P0 is defined as being the eighth time point t8, at which an optical flash, e.g., the light, is generated to a subsequent initial point t0 at which point a next x-ray is generated during the next x-ray generating period XR, as shown in FIG. 4a. Therefore, the electric potential at the coupling node N1 of the x-ray detector according to an exemplary embodiment of the present invention is uniformly maintained at the first voltage VA1 at the initial point t0 when the next x-ray is generated during the next offset control period P0.

Therefore, although the x-ray is provided from the x-ray generator 210 (FIG. 1) at irregular intervals, the electric potential at the coupling node N1 is uniformly maintained. As a result, an image distortion, caused by an offset voltage deviation in the coupling node N1, is effectively prevented.

In summary, according to exemplary embodiments as described herein, an offset control period is provided between two x-ray detecting periods which turn on a switching device of a light detecting pixel to output an electrical signal corresponding to an x-ray. The x-ray detecting period includes a first gate-on period transmitting the gate signal to turn on the switching device of the light detecting pixel, and the offset control period includes flash periods which apply light to the photodiode and a second gate-on period which transmits the gate signal which turns on the switching device of the light detecting pixel in a period where the light is not applied.

Therefore, according to exemplary embodiments of the present invention as described herein, an electric potential at a coupling node of a photodiode and a switching device is uniformly maintained at an end time point of a gate-on period, thereby effectively preventing image distortion caused by an offset voltage deviation.

The present invention should not be construed as being limited to the exemplary embodiments set forth herein. Rather, these exemplary embodiments are provided so that this disclosure will be thorough and complete and will fully convey the concept of the present invention to those skilled in the art.

Although the present invention has been particularly shown and described with reference to exemplary embodiments thereof, it will be understood by those of ordinary skill in the art that the present invention should not be limited to these exemplary embodiments and that various changes and modifications in form and details may be made therein without departing from the spirit or scope of the present invention as defined by the following claims.

What is claimed is:

1. An x-ray detector having an x-ray generator which emits an x-ray, the x-ray detector comprising:
   a light detecting pixel comprising:
      a photodiode which detects the x-ray emitted from the x-ray generator during an x-ray detecting period and outputs an electrical signal corresponding to the x-ray; and
      a switching device connected to the photodiode;
   a light-generating sheet which provides a light to the photodiode during a plurality of first flash periods of an offset control period;
   a gate driver which outputs a gate signal to the switching device, the gate signal comprising:
      a first gate turn-on signal which turns on the switching device during a first gate turn-on period of the x-ray detecting period; and
      a second gate turn-on signal which turns on the switching device during a plurality of second gate turn-on periods of the offset control period; and
   a read-out circuit which receives a signal output from an output terminal of the switching device,
   wherein the plurality of first flash periods repeatedly occurs during the offset control period and the plurality of second gate turn-on periods repeatedly occurs at different times from the plurality of first flash periods during the offset control period, and
   durations of the plurality of first flash periods are sufficient to saturate the photodiode.

2. The x-ray detector of claim 1, wherein the gate signal is maintained at a gate-off voltage during the plurality of first flash periods and the second flash period.

3. The x-ray detector of claim 2, wherein the read-out circuit receives the signal output from the output terminal of the switching device during the first gate turn-on period.

4. The x-ray detector of claim 2, wherein the electrical signal is initialized during a signal deleting period between the x-ray detecting period and the offset control period,
   the light generating sheet provides the light to the photo diode during a second flash period of the signal deleting period to initialize the electrical signal, and the gate signal further comprises a third gate turn-on signal which turns on the switching device during a third gate turn-on period of the signal deleting period, the third gate turn-on period being between the first gate turn-on period of the x-ray detecting period and the plurality of second gate turn-on periods of the offset control period.

5. The x-ray detector of claim 4, wherein a number of the plurality of first flash periods varies for every frame, and
a number of the plurality of second gate-on periods varies for every frame.

6. The x-ray detector of claim 4, wherein the switching device comprises a transistor which receives the gate signal from the gate driver, and
the gate signal is maintained at a gate-on voltage during the first gate turn-on period, the plurality of second gate turn-on periods and the third gate turn-on period.

7. The x-ray detector of claim 2, wherein the durations of the plurality of first flash periods are equal.

8. The x-ray detector of claim 2, wherein the durations of the plurality of first flash periods are not equal.

9. A method of driving an x-ray detector having a switching device connected to a light detecting pixel comprising a photodiode which detects an x-ray emitted from an x-ray generator during an x-ray detecting period and outputs an electrical signal corresponding to the x-ray, the method comprising:
receiving the x-ray from the x-ray generator with the photodiode during the x-ray detecting period to generate the electrical signal corresponding to the x-ray;
turning on the switching device during a first gate turn-on period of the x-ray detecting period to transmit the electrical signal to an external component;
providing a light to the photodiode during an offset control period;
turning on the switching device during a second gate turn-on period of the offset control period during which the light is not provided to the photodiode to maintain an electric potential at a coupling node disposed between the photodiode and the switching device at a predetermined level,
wherein the offset control period comprises a plurality of first flash periods during which the light is provided to the photodiode, and
wherein durations of the plurality of first flash periods are sufficient to saturate the photodiode.

10. The method of claim 9, wherein the offset control period comprises:
a plurality of second gate turn-on periods during which the switching device is turned on,
a gate signal is maintained at a gate-on voltage during the plurality of second gate turn-on periods, and
the gate signal is maintained at a gate-off voltage during first flash periods of the plurality of first flash periods.

11. The method of claim 10, wherein the durations of the plurality of first flash periods are equal.

12. The method of claim 10, wherein the durations of the plurality of first flash periods are not equal.

13. The method of claim 10, wherein a number of the plurality of first flash periods is varied for every frame, and
a number of the plurality of second gate turn-on periods is varied for every frame.

14. The method of claim 9, further comprising initializing the electrical signal during a signal deleting period between the x-ray detecting period and the offset control period.

15. The method of claim 14, wherein the signal deleting period comprises:
a second flash period during which the light is provided to the photodiode; and
a third gate turn-on period in which the light is not provided to the photodiode and during which the electric potential at the coupling node is initialized in response to the gate signal during a period.

16. The method of claim 14, wherein the signal deleting period is divided into a second flash period during which the light is provided to the photodiode and a third gate turn-on period after the second flash period and during which the switching device is turned on,
the gate signal is maintained at a gate-off voltage during the second flash period, and
the gate signal is maintained at a gate-on voltage during the third gate turn-on period.

* * * * *